(12) United States Patent
Reuss et al.

(10) Patent No.: US 7,707,998 B2
(45) Date of Patent: May 4, 2010

(54) INTERNAL COMBUSTION ENGINE AND METHOD FOR OPERATING AN INTERNAL COMBUSTION ENGINE

(75) Inventors: Thomas Reuss, Neuenstadt (DE); Martin Gruber, Bad Wimpfen (DE); Axel Macher, Neudenau (DE)

(73) Assignee: Audi AG, Ingolstadt (DE)

( * ) Notice: Subject to any disclaimer, the term of this patent is extended or adjusted under 35 U.S.C. 154(b) by 45 days.

(21) Appl. No.: 11/987,846

(22) Filed: Dec. 5, 2007

(65) Prior Publication Data

US 2009/0025698 A1 Jan. 29, 2009

(51) Int. Cl.
*F02B 47/08* (2006.01)
*F02B 47/10* (2006.01)

(52) U.S. Cl. .................. 123/568.12; 701/108

(58) Field of Classification Search ............ 123/568.12, 123/568.11, 563; 701/108; 60/605.2, 605.1, 60/278, 280, 298

See application file for complete search history.

(56) References Cited

U.S. PATENT DOCUMENTS

| | | | |
|---|---|---|---|
| 5,205,265 A | * | 4/1993 | Kashiyama et al. .... 123/568.12 |
| 5,607,010 A | * | 3/1997 | Schonfeld et al. ............. 165/51 |
| 5,617,726 A | * | 4/1997 | Sheridan et al. ............ 60/605.2 |
| 5,713,330 A | | 2/1998 | Hitomi et al. |
| 6,244,256 B1 | * | 6/2001 | Wall et al. .............. 123/568.12 |
| 6,408,833 B1 | * | 6/2002 | Faletti .................... 123/568.17 |
| 7,299,793 B1 | * | 11/2007 | Tyo et al. ............... 123/568.12 |
| 7,426,830 B2 | * | 9/2008 | Schorn et al. ................. 60/612 |
| 2006/0101819 A1 | * | 5/2006 | Schorn et al. ................. 60/602 |
| 2007/0125081 A1 | * | 6/2007 | Czarnowski et al. .......... 60/599 |
| 2008/0092861 A1 | * | 4/2008 | Duffy et al. ............ 123/568.12 |

FOREIGN PATENT DOCUMENTS

DE 100 49 314 4/2002
FR 2 876 417 4/2006

* cited by examiner

*Primary Examiner*—Mahmoud Gimie
(74) *Attorney, Agent, or Firm*—Novak Druce & Quigg LLP

(57) ABSTRACT

The invention relates to a method for operating an internal combustion engine, in which the exhaust gas generated by the internal combustion engine is returned to the internal combustion engine by means of an exhaust gas recirculation device having at least two cooling devices which are each associated with a bypass, the exhaust gas being cooled in the exhaust gas recirculation device as a function of the load state of the internal combustion engine. The operation of the internal combustion engine is divided into at least four load states, and as a function of the instantaneous load state the exhaust gas is returned to the internal combustion engine via a flow path in the exhaust gas recirculation device specifically assigned to this load state. The invention further relates to an internal combustion engine having an exhaust gas recirculation device.

12 Claims, 2 Drawing Sheets

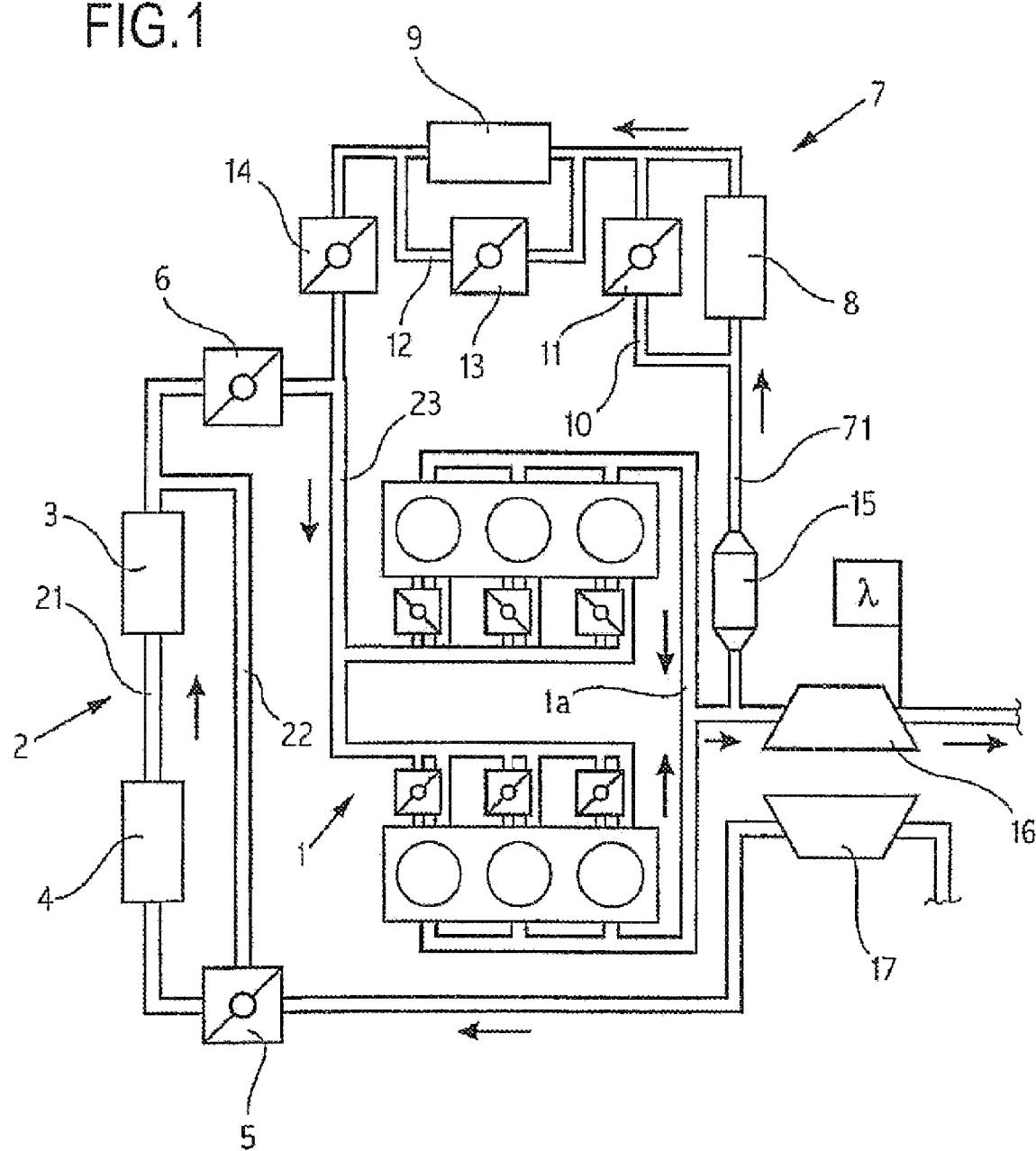

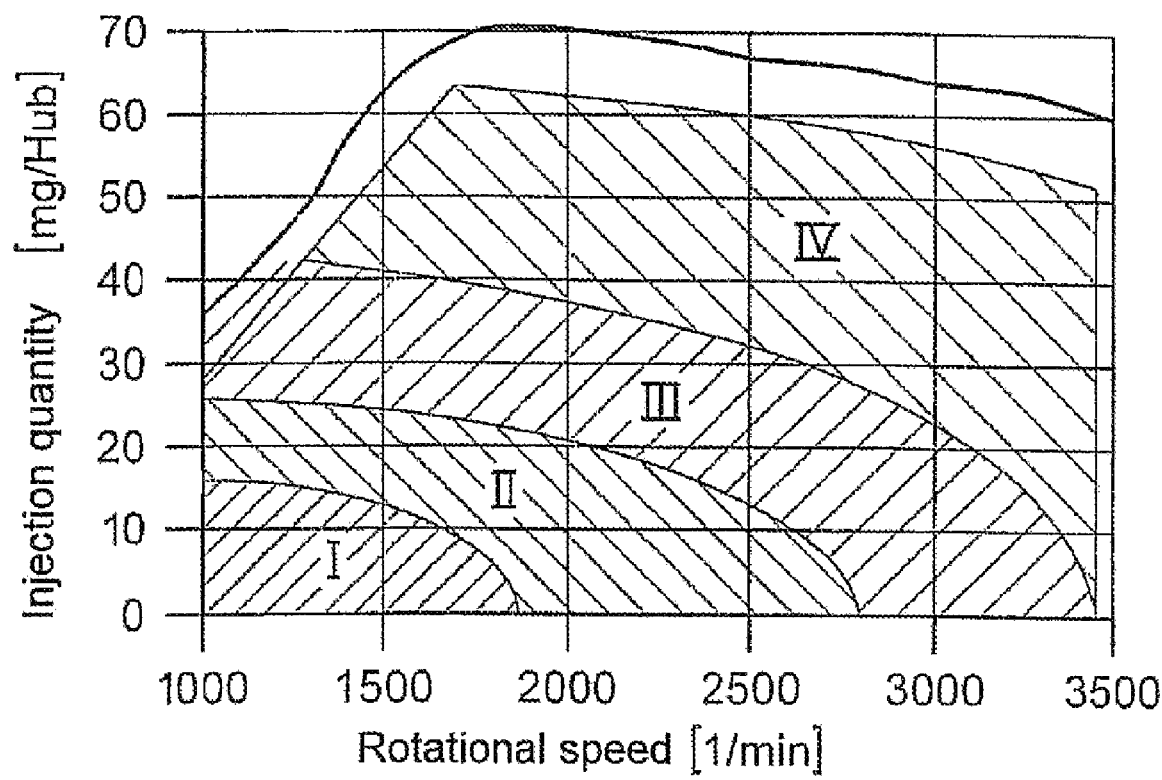
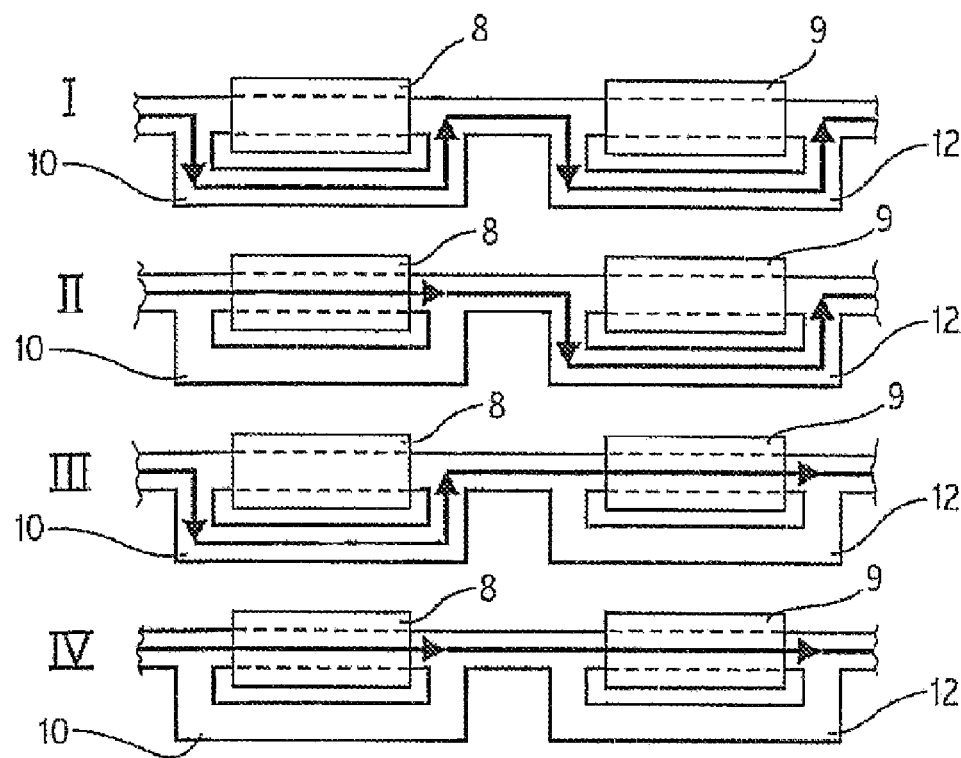

INTERNAL COMBUSTION ENGINE AND METHOD FOR OPERATING AN INTERNAL COMBUSTION ENGINE

CROSS REFERENCE TO RELATED APPLICATIONS

This application claims priority from German Application No. 10 2006 057 498.3 filed Dec. 6, 2006; hereby incorporated by reference, in its entirety.

The invention relates to a method for operating an internal combustion engine, in which the exhaust gas generated by the internal combustion engine is returned to the internal combustion engine by means of an exhaust gas recirculation device having at least two cooling devices which are each associated with a bypass. The exhaust gas is cooled in the exhaust gas recirculation device as a function of the load state of the internal combustion engine. The invention further relates to a corresponding internal combustion engine having tin exhaust gas recirculation device.

BACKGROUND OF THE INVENTION

An internal combustion engine is known from DE 101 47 536 A1, in which ah exhaust gas heat exchanger thermally connected to the exhaust gas system is provided in an intake system which may be activated or deactivated via control valves, designed as flaps. The exhaust gas heat exchanger may be bypassed on the intake system side as well as on the discharge system side by means of bypass lines.

Furthermore, a diesel engine is known from DE 103 47 834 A1 which has an exhaust gas aftertreatment device. The exhaust gas recirculation device comprises a dual-path system, a cooling device being provided in a first path, and the second path being connected in parallel to the first path. An intercooler is also provided in the charge air feed line.

An internal combustion engine having exhaust gas recirculation is known from DE 10 2004 021 386 A1, in which two heat exchangers are provided in an exhaust gas recirculation line. The exhaust gas flowing through the two heat exchangers is thus cooled. An additional heat exchanger is provided in a charge air line.

An internal combustion engine is also known from FR287 64 17, in which two heat exchangers are provided in series in an exhaust gas recirculation line. A three-way valve is respectively provided upstream from the first heat exchanger and between the two heat exchangers, a bypass branching off from each three-way valve. Depending on the load state of the internal combustion engine, the exhaust gas may be led through the two heat-exchangers or through the bypass. If the engine is under moderate load, the exhaust gas is led through the first heat exchanger and bypasses the second heat exchanger. In the known internal combustion engines and operating methods, the ability to cool the exhaust gas as needed is inadequate at best.

The object of the present invention, therefore, is to provide a method and an internal combustion engine by means of which a highly efficient reduction in nitrogen oxide emissions in a broader range of the characteristic map is possible while avoiding fouling of the coolers.

SUMMARY OF THE INVENTION

This object is achieved by use of a method having the features of claim 1, and an internal combustion engine having an exhaust gas recirculation device having the features of claim 10.

In a method according to the invention for operating an internal combustion engine, exhaust gas generated by the internal combustion engine is returned to the internal combustion engine by means of art exhaust gas recirculation device having at least two cooling devices which are each associated with a bypass. The exhaust gas is optionally cooled in the exhaust gas recirculation device as a function of the load state of the internal combustion engine. The operation of the internal combustion engine is divided into at least four load states, and as a function of the instantaneous load state the exhaust gas is returned to the internal combustion engine via a flow path in the exhaust gas recirculation device specifically assigned to this load state. The exhaust gas may be more precisely cooled as needed as a result of the division of such a plurality of load states. The capacity demand for cooling the recirculated, exhaust gas may thus be provided more efficiently and effectively, and the cooling capacity may be better adapted to the particular instantaneous demand as a result of the numerous combination options. The deposition of exhaust gas components, referred to as fouling, in the system may thus be significantly reduced.

The at least four load states are preferably specified as a function of the engine rotational speed and/or an injected quantity of fuel. Depending on the type of vehicle and the corresponding design of the internal combustion engine, the load states may be defined in a very individualized manner, resulting in the ability to perform individualized cooling of the exhaust gas as needed in the particular load states. The load states are preferably contiguously specified in a diagram by use of the referenced specific parameters. In particular, in a diagram plotting the injection quantity as a function of the rotational speed a first load state may be extended to a rotational speed value of approximately 1800 revolutions per minute. For this first load-state a maximum injection quantity of approximately 18 mg/stroke may be correspondingly specified for this first load state. The first load state is preferably defined in such a way that, starting from a maximum value of an injection quantity which is present at a rotational speed of approximately 1000 revolutions per minute, the first load state drops, in particular in a steady manner, to a value of 0 at a maximum rotational speed of approximately 1800 revolutions per minute for this first load state.

Subsequent to this first load state a second state may be defined which is immediately contiguous to this first load state, and which in the diagram extends to a rotational speed of approximately 2750 revolutions per minute. The injection quantity extends from a value of 0 mg/stroke to a maximum of approximately 28 mg/stroke. Here as well, it is preferred that the curve representing, the upper limit of this second load state steadily drops with increasing rotational speed, starting from a minimum rotational speed of approximately 1000 revolutions per minute and a maximum injection quantity of approximately 28 mg/stroke.

In a corresponding manner, this may then be specified for a third load state contiguous to the second load state, the lower limit range of the third load state being specified by the upper limit range of the second load state, and the upper limit range of the third load state being delimited by a curve in which the injection quantity steadily drops with increasing rotational speed. The third load state reaches a maximum rotational speed of approximately 3400 revolutions per minute. The maximum injection quantity is 42 mg/stroke, for example. In turn, a fourth load state may then be specified in die diagram contiguous to the third load state, the lower limit of the fourth load state being specified by the characteristic curve of the upper limit of the third load state.

In a first load state characterizing a low load on the internal combustion engine, the exhaust gas preferably bypasses the cooling devices of the exhaust gas recirculation device and is led through the bypasses. The cooling effect in this phase is relatively low. This is sufficient, however, since in this first load state the temperature of the exhaust gas is relatively low.

In a second load state characterizing a higher load on the internal combustion engine compared to the first load state, the exhaust gas is preferably led through a first cooling device, in particular a first cooling device in a series connection of cooling devices, upstream from the second cooling device, and through the bypass for the second cooling device. In this particular phase the exhaust gas is explicitly led in a uniform manner through die first cooling device, thereby achieving a corresponding cooling effect.

In a third load state characterizing a higher load on the internal combustion engine compared to the second load state, the exhaust gas is led through a second cooling device, in particular a second cooling device in a series connection of cooling devices, downstream from the first cooling device, and through the bypass for the first cooling device. In contrast to the second load state, the exhaust gas, which in comparison to the second load state is generally hotter, is first led through a bypass to achieve corresponding cooling on a long path outside the cooling device, and only then is led into a second cooling device for further, more intensive cooling.

In a fourth load state characterizing a higher load on the internal combustion engine compared to the third load state, the exhaust gas is led through both cooling devices. Very effective cooling may be achieved specifically when the exhaust gas has a relatively high temperature. The capacity demand for cooling the recirculated exhaust gas may be provided as a function of the operating point of the internal combustion engine, and preferably of the environmental thermodynamic conditions. The combination of multiple cooling devices, which may be connected in series or parallel, and the respective bypasses allows very precise cooling as it is needed when a division is made into at least four load states of the internal combustion engine.

In this manner it is possible to achieve a highly efficient reduction in nitrogen oxide emissions in a broad range of the characteristic map while avoiding fouling of the coolers.

Fresh air is preferably fed to the internal combustion engine via an air charge feed device which includes at least one cooling device and at least one bypass connected in parallel to the cooling device, the fresh air being led through die cooling device and/or die bypass, independent of the operating state of the internal, combustion engine, in particular the load state of the internal combustion engine. This design allows not only optimal cooling of the recirculated exhaust gas, but also the cooling of fresh air in an individualized manner as needed. In this manner the temperature of the recirculated exhaust gas and the mixing temperature resulting from exhaust gas and fresh air may be set precisely to a particular desired target temperature, and deposits of exhaust gas components in the system may be significantly reduced.

The fresh air is preferably led through at least two cooling devices of the air charge feed device connected in series, and/or through the bypass connected in parallel to the two cooling devices, as a function of the load state of the internal combustion engine and/or a specifiable target temperature in an air charge line. The fresh air may thus be cooled as needed. In normal operation of the internal combustion engine a portion of the fresh air may be led through the bypass and the cooling devices. In particular in overrun phases of the vehicle at elevated load on the internal combustion engine, the fresh air is preferably led only through the bypass. If the instantaneous temperature in the charge air line exceeds the specified target temperature, the fresh air is preferably led through at least one of the cooling devices. Depending on the magnitude of the temperature deviation, the fresh air may be led specifically through the first, or the second, or both cooling devices. The target temperature is preferably specifiable as a function of the total vehicle-specific package, which includes the internal combustion engine, exhaust gas recirculation, and air charge feed.

A separate bypass may also be connected in parallel to each cooling device of the air charge feed, device, and depending on the operating state of the internal combustion engine, in particular the at least four load states and/or the target temperature, a specific strategy is then specified in each case by means of which the fresh air is cooled as needed. The fresh air may be correspondingly led through none of the cooling devices, through the first cooling device and the second bypass, through the first bypass and the second cooling device, or through both codling devices of the charge air feed line as a function of the load state. The various referenced flow paths of the fresh air may be specified by the air charge feed device corresponding to or analogous to the specified flow paths of the exhaust gas through; the corresponding cooling devices and bypasses of the exhaust gas recirculation device as a function of the four load states.

The precision of the temperature setting of the fresh air, and thus also of the air mixture of exhaust gas and fresh air, may thus also be specified.

An internal combustion engine according to the invention includes an exhaust gas recirculation device for recirculating exhaust gas generated by the internal combustion engine, the exhaust gas recirculation device comprising at least two cooling devices for cooling the exhaust gas as a function of the load state of the internal combustion engine, and the cooling devices each being connected in parallel to a bypass. The operation of the internal combustion engine is divided into at least four load states, and as a function of the instantaneous load state the exhaust gas may be returned to the internal combustion engine via a flow path in the exhaust gas recirculation device specifically assigned to this load state. The recirculated exhaust gas may thus be cooled as needed. Individualized cooling of the exhaust gas may be better performed, depending on the situation, as a result of the relatively high number of defined load states.

A charge air feed device for feeding fresh air to the internal combustion engine preferably includes at least one cooling device which is connected in parallel to a bypass. In this manner the temperature of the fresh air may be set more/precisely, as needed, depending on the situation. The charge air feed device may preferably include at least two cooling devices connected in series, each connected in parallel to a single bypass.

Each of the cooling devices may also be connected in parallel to a separate bypass.

An optimal temperature of an intake manifold and an optimal mixing ratio of exhaust gas and fresh air may be achieved by such regulation of die charge air cooling, as well as by a temperature of the recirculated exhaust gas which is settable or adjustable in cooling capacity.

The precise exhaust gas recirculation rate may preferably be controlled by use of an exhaust gas sensor, for example a lambda, probe.

At least one of the cooling devices of the exhaust gas recirculation device, in particular the second cooling device downstream from the first cooling device, and/or at least one cooling device of the air charge feed device may be coupled to a low-temperature cooling circuit. Temperature values between 30° C. and 40° C. preferably predominate in these devices. If only one of the cooling devices is connected to the low-temperature cooling circuit, the second cooling device may be connected to a separate cooling circuit in which temperatures of approximately 90° C. may predominate.

By use of the invention, various environmental conditions such as environmental temperature and altitude, and the thermodynamic boundary conditions for combustion (fresh air, exhaust gas, temperature) may be kept essentially constant, thereby significantly increasing the optimal emission and consumption range during operation.

When homogeneous diesel combustion is employed, the combustion conditions may be kept essentially constant over a broad operating range. Thus, in the proposed design use may be made of a low-temperature cooling circuit having register exhaust gas recirculation cooling.

For exhaust gas aftertreatment systems such as selective catalytic reduction (SCR), $NO_x$ storage systems, particle filters, or a combination of these systems, the exhaust gas temperature may be adjusted to improve the efficiency under various environmental conditions. In operation, in particular during the cold season, this results in a consumption advantage during regeneration cycles, and improved component protection for Oxikat and diesel particle filters (DPF) may be achieved.

BRIEF DESCRIPTION OF THE DRAWINGS

Exemplary embodiments of the invention are explained in greater detail below with reference to schematic drawings, which show die following:

FIG. 1 shows a schematic illustration of an internal combustion engine according to the invention, having an exhaust gas recirculation device and an air charge feed device;

FIG. 2 shows a diagram in which the injection quantity is represented as a function of the rotational speed of die internal combustion, engine for four load states of the internal combustion engine; and FIG. 3 shows illustrations of flow paths of the recirculated exhaust gas in the exhaust gas recirculation device as a function of the particular associated load states.

Identical or functionally equivalent elements are provided with the same reference numerals in the figures.

DETAILED DESCRIPTION OF THE PREFERRED EMBODIMENTS OF THE INVENTION

FIG. 1 illustrates an internal combustion engine 1 which is provided with or connected to a charge air feed device and an exhaust gas recirculation, device. The charge air feed device 2 comprises a first flow path 21 in which in the exemplary embodiment two cooling devices 3 and 4, designed as heat exchangers, are provided in series. Parallel to this first path 21 a second path designed as a bypass 22 is provided parallel to the two cooling devices 3 and 4 and thus also parallel to the first path 21. The particular flow path through which the fresh air is led through the air charge feed device 2 may be adjusted via a valve 5. A second valve 6 is also provided in the air charge feed device 2, downstream from the first path 21 and the bypass 22 and upstream from an opening of an exhaust gas recirculation device 7 into an intake manifold or air charge line 23.

In the exemplary embodiment a single common bypass 22 is connected in parallel to both cooling devices 3 and 4. Each cooling device 3 or 4 may also be connected in parallel to a separate bypass 22.

The exhaust gas recirculation device 7 branches off from an exhaust gas line 1a in which the exhaust gas generated by the internal combustion engine 1 is discharged. To this end, die exhaust gas recirculation device 7 includes a branch line 71 in which two cooling devices 8 and 9, likewise designed, as heat exchangers, are also provided in series. A first bypass 10 is connected, in parallel to cooling device 8, and a second bypass 12 is connected in parallel to cooling device 9. A separate bypass 10 or 12 is thus connected in parallel to each cooling device 8 or 9 of the exhaust gas recirculation device 7. A valve 11 is provided in bypass 10, and a valve 13 is provided in bypass 12. An additional valve 14 is provided upstream from, the location at which the exhaust gas recirculation device 7 opens into the charge air line 23 or the intake manifold. A catalyst 15 is also provided in the branch line 71 upstream from cooling device 8. The two valves 11 and 13 may also be provided at die respective branches of the flow paths, upstream from the respective associated bypass 10 and 12 and the associated cooling device 8 and 9, and may be designed as a 3-way valve. In this manner the location at which the exhaust gas flows through may be exactly adjusted.

Also provided in the exhaust gas line is a turbine 16 which is connected to a compressor 17 to form an exhaust gas turbocharger. The compressor 17 is situated in a subline in the charge air feed device 2 which supplies fresh air.

FIG. 2 shows a diagram in which the injection quantity is represented as a function of the rotational speed of the internal combustion engine 1. The diagram shows four load states I through IV of the internal combustion engine 1 which are specifically and individually specified, regardless of the specific routing of the exhaust gas in the exhaust gas recirculation device 7. As shown in the illustration in FIG. 2, the first load state I characterizes a relatively low load on the internal combustion engine 1. Load state II characterizes a higher load on the internal combustion engine 1 compared to the first load state. The same applies to load states III and IV. In the exemplary embodiment, die four load states are immediately contiguous to one another, the transition regions each being specified by a characteristic curve which, starting from a maximum value of an injection quantity, steadily decreases with increasing rotational speed. In the exemplary embodiment these delimiting curves are plotted in such a way that at the maximum rotational speed, which delimits the particular load state, the curves drop to an injection quantity of 0 mg/stroke.

The diagram shown in FIG. 2 is provided only as an example. The four explicit load states and their range limits are likewise provided by way of example. It is important that at least four load states are specified, and in particular that the cooling of the recirculated exhaust gas may be performed as needed.

FIG. 3 shows the flow paths of the recirculated exhaust gas in the exhaust gas recirculation device 7 which are associated with load states I through IV.

In the first load state I the exhaust gas to be recirculated is not led through either cooling device 8 or cooling device 9. The entire quantity of recirculated exhaust gas is led, through bypasses 10 and 12, thus bypassing cooling devices 8 and 9.

In the second load state IT the exhaust gas to be recirculated is led through the first cooling device 8 and bypasses second cooling device 9, passing through the associated bypass 12.

In the third load state in the exhaust gas to be recirculated is led through the bypass 10 connected in parallel to codling device 8, and through second cooling device 9.

In the fourth load state IV the exhaust gas to be recirculated is led through both cooling devices 8 and 9.

In addition, the fresh air is led through the charge air feed device 2, independent of the operating state of the internal combustion engine 1, at a predetermined target temperature of 18° C., for example, in the air charge line 23.

In one design in which a separate bypass is connected in parallel to each cooling device 3 or 4, as shown by way of example in FIG. 1 for cooling devices 8 and 9 in the exhaust gas recirculation device 7, the fresh air may also be led separately, independent of the four load states corresponding to the example in FIG. 3.

The invention claimed is:

1. A method for operating an internal combustion engine, in which the exhaust gas generated by the internal combustion engine is returned to the internal combustion engine by means of an exhaust gas recirculation device having at least two cooling devices which are each associated with a bypass, the exhaust gas being cooled in the exhaust gas recirculation device as a function of the load state of the internal combustion engine, consisting of:
    recirculating said exhaust gases to said engine selectively through multiple routes provided by said cooling devices and said bypasses thereof, responsive to certain load from at least four load states of said engine.

2. The method according to claim 1, wherein
    the load states are specified independently of the engine rotational speed and/or an injected quantity of fuel.

3. The method according to claim 1, wherein
    in a first load state attributable to a low load on the internal combustion engine, the exhaust gas bypasses the cooling devices and is led through the bypasses thereof.

4. The method according to one claim 3 wherein
    in a second load state attributable to a higher load on the internal combustion engine compared to the first load state, the exhaust gas is led through a first of said cooling devices upstream from the second cooling device, and through the bypass for the second cooling device.

5. The method according to claim 4 wherein
    in a third load state attributable to a higher load on the internal combustion engine compared to the second load state, the exhaust gas is led through the second cooling device, downstream from the first cooling device, and through the bypass for the first cooling device.

6. The method according to claim 5 wherein
    in a fourth load state attributable to a higher load on the internal combustion engine compared to the third load state, the exhaust gas is led through both cooling devices.

7. The method according to claim 1 wherein
    feeding fresh air to the internal combustion engine via an air charge feed device which includes at least one cooling device and at least one bypass connected in parallel to the cooling device, the fresh air being led through the cooling device and/or the bypass independent of the load state.

8. The method according to claim 7, wherein
    the fresh air is led through at least two cooling devices connected in series and/or through a bypass connected in parallel to the two cooling devices.

9. The method according to claim 7 including
    coupling least one cooling device of the exhaust gas recirculation device and/or at least one cooling device of the air charge feed device to a low-temperature cooling circuit.

10. An internal combustion engine having an exhaust gas recirculation device for recirculating exhaust gas generated by the internal combustion engine, the exhaust gas recirculation device including at least two cooling devices for cooling the exhaust gas as a function of the load state of the internal combustion engine, a bypass being connected in parallel to each of the cooling device, wherein
    the operation of internal combustion engine is divided into at least four load states, and as a function of a given instantaneous load state the exhaust gas is returned to the internal combustion engine via a flow path in the exhaust gas recirculation device corresponding to this load state.

11. An internal combustion engine according to claim 10, including
    a charge air feed device for supplying fresh air to the internal combustion engine comprising at least two cooling devices to which a bypass is connected in parallel.

12. An internal combustion engine according to claim 10, wherein
    at least one cooling device of the exhaust gas recirculation device and/or at least one cooling device of the charge air feed device is coupled to a low-temperature cooling circuit.

* * * * *

UNITED STATES PATENT AND TRADEMARK OFFICE
CERTIFICATE OF CORRECTION

| | | |
|---|---|---|
| PATENT NO. | : 7,707,998 B2 | Page 1 of 1 |
| APPLICATION NO. | : 11/987846 | |
| DATED | : May 4, 2010 | |
| INVENTOR(S) | : Reuss et al. | |

It is certified that error appears in the above-identified patent and that said Letters Patent is hereby corrected as shown below:

Col. 8, line 18 after "coupling" insert --at--

Signed and Sealed this
Eleventh Day of January, 2011

David J. Kappos
*Director of the United States Patent and Trademark Office*